March 24, 1964    I. M. ABESS    3,125,779
STUFFING RETAINER
Filed Sept. 11, 1962
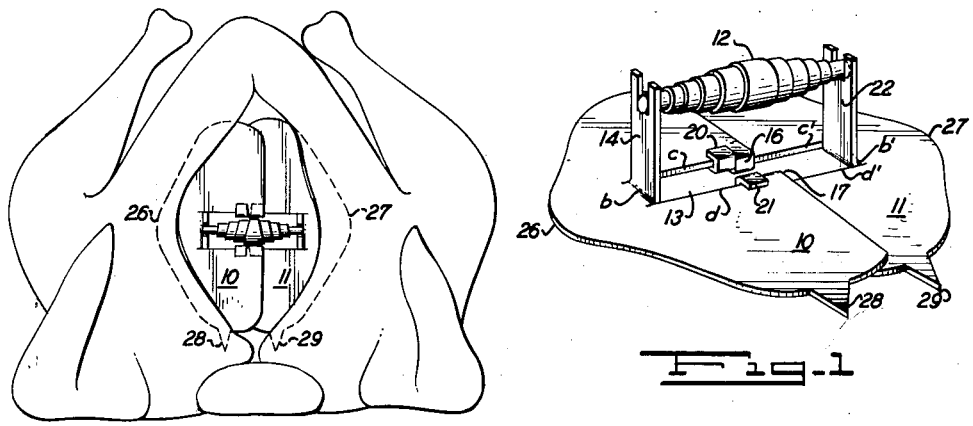
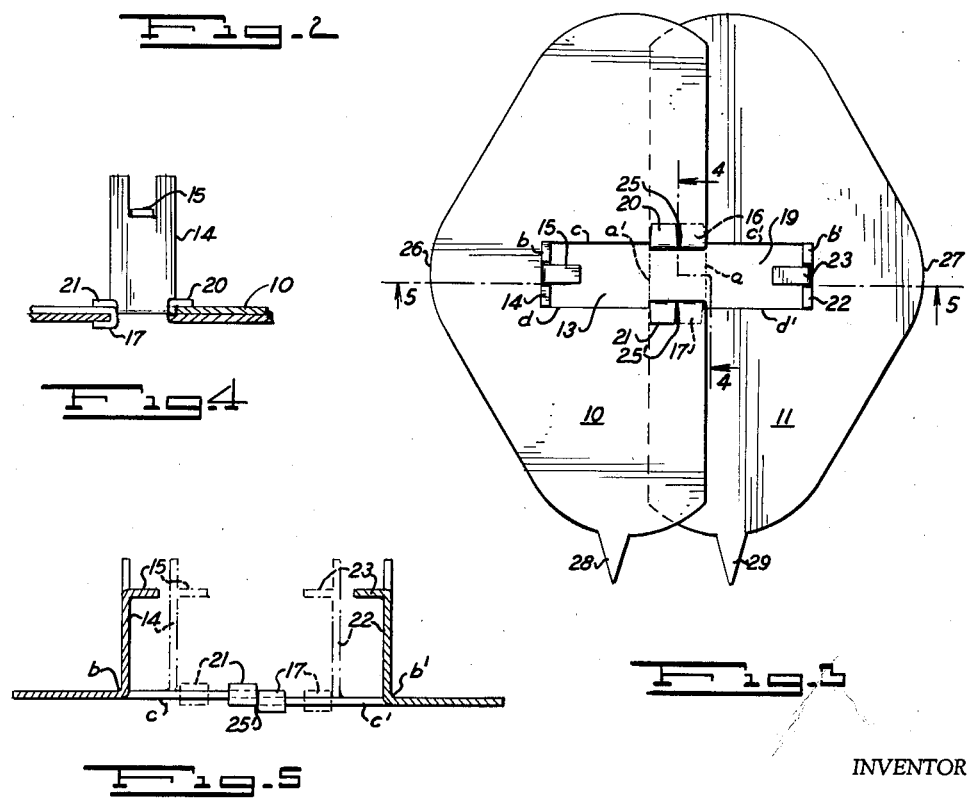
INVENTOR
IRENE M. ABESS
BY Jacobi & Davidson
ATTORNEYS

United States Patent Office 3,125,779
Patented Mar. 24, 1964

3,125,779
STUFFING RETAINER
Irene M. Abess, 6721 SW. 69th Terrace,
South Miami, Fla.
Filed Sept. 11, 1962, Ser. No. 222,882
11 Claims. (Cl. 17—11)

This invention relates to devices used in the preparation of food, and particularly to a device used to close an opening in a fowl to insure that the stuffings be retained in the fowl during preparation and cooking.

Various devices and expedients have heretofore been suggested for closing the opening of a fowl and thereby preventing the stuffings contained therein from falling out. However, all of the devices previously suggested are either time consuming, cumbersome, involve the use of multiple parts, or fail to effectively perform the intended function.

Included among the expedients previously suggested have been a needle and thread sewing operation, the utilization of a plurality of pins, and a clamping device which acts as a closure and is maintained to the fowl by clasping the skin immediately adjacent the opening between two clamps. These prior expedients all present patent disadvantages such as the lengthy time period consumed in utilizing the devices or carrying out the required operation, the awkward clumsiness inherent in the utilization of a device with multiple parts, and the danger of losing or misplacing one of the multiple parts—the loss of any one of which renders the device or operation ineffective. Moreover, the well-known tendency of fowl to become brittle and tear under cooking conditions makes useless closing devices or methods which are dependent upon physical adhesion to the fowl for support.

The present invention has as its primary object to provide a stuffing retainer which can be easily and quickly inserted within the opening of a fowl and which will remain in place during the entire cooking operation.

More specifically, a primary object of the present invention is to provide a stuffing retainer which incorporates two relatively movable plate members that can be compressed and inserted through the opening and then, after the plate members have been inserted, releasing the same whereby they expand against the inner walls of the fowl thus effectively sealing the opening.

Still further, other and more specific objects of the invention are: (a) to provide an integral one-piece unit, which is never disassembled and thus prevents the loss of parts; (b) to provide a stuffing retainer which will remain in place even should the fowl skin tear during preparation; (c) to provide a stuffing retainer which can be effectively utilized even though the opening is so mutilated that the usual sewing or pin operations cannot be used; (d) to provide a stuffing retainer which can be economically manufactured; and (e) to provide a stuffing retainer which performs its function independent of adhesion or positive connection to the fowl.

The invention will be better understood, and objects other than those specifically set forth hereinabove will become apparent, when consideration is given to the following detailed description. Such description refers to the annexed drawings presenting the preferred and illustrative embodiments of the invention. In the drawings:

FIGURE 1 is a perspective view of the invention in expanded position;

FIGURE 2 is a plan view on a reduced scale, of the invention in use;

FIGURE 3 is a plan view, on an enlarged scale, of the invention, in expanded position, but without its spring;

FIGURE 4 is a fragmentary sectional view taken on line 4—4 of FIGURE 3;

FIGURE 5 is a sectional view taken on line 5—5 of FIGURE 3, the closed position of the invention being shown in dot-dash lines.

As is best illustrated by reference to FIGURE 1, the device basically consists of two plate members 10 and 11 and a compression spring 12. The plate members 10 and 11 are arcuately convexly contoured to conform to the inner walls of a fowl as shown clearly by FIGURE 2. Referring to FIGURE 3, plate member 10 is an integral one-piece unit and includes a transverse open-ended slot 13 having an open end $a$, a closed end $b$, and sides $c$ and $d$, said slot 13 being disposed intermediate the extremities of plate member 10. The sides $c$ and $d$ of open-ended slot 13 culminate in opposite facing turned-down, U-shaped tabs 16 and 17 disposed adjacent the open end $a$ of slot 13. Disposed along the closed end $b$ of open-ended slot 13 is a leg member 14, integral with plate member 10, extending upward from the closed end $b$ of slot 13 and having an inward-facing projection 15.

Plate member 11 is peripherally shaped like plate member 10 and is an integral one-piece unit including a transverse open-ended slot 19, having an open end $a'$, a closed end $b'$, and sides $c'$ and $d'$. Slot 19 is disposed intermediate the extremities of plate member 11. The sides $c'$ and $d'$ of open-ended slot 19 culminate in opposite-facing, turned-up, U-shaped tabs 20 and 21 disposed adjacent the open end $a'$ of slot 19. Disposed along the closed end $b'$ of open-ended slot 19 is a leg member 22, integral with plate member 11, extending upward from the closed end $b'$ of slot 19 and having an inward-facing projection 23.

The length of the sides $c$ and $d$ of slot 13 is defined by the lateral distance between U-shaped tab 16 and closed-end portion $b$ and between U-shaped tab 17 and closed-end portion $b$, respectively. The length of sides $c'$ and $d'$ of slot 19 is defined by the transverse distance between tab 20 and closed-end portion $b'$ and tab 21 and closed-end portion $b'$.

By virtue of plate member 10 having opposite-facing, turned-down U-shaped tabs 16 and 17 and plate member 11 having opposite-facing, turned-up U-shaped tabs 20 and 21, the plate members 10 and 11 are slidably interlocked, so that the turned-down tabs 16 and 17 adjacent the open-end $a$ of open-end slot 13 on plate member 10 will interlock and be slidably, engageable with the sides $c'$ and $d'$ of open-end slot 19 on plate member 11 and at the same time turned-up tabs 20 and 21 adjacent the open end $a'$ of open-ended slot 19 on plate member 11 will interlock and be slidably, engageable with the sides $c$ and $d$ of open-ended slot 13 on plate member 10 such that plate member 10 is reciprocal with respect to plate member 11. When the plate members 10 and 11 are thus interlocked, the open-ended transverse slots 13 and 19 will be aligned-facing and the plate member 10 will be slidable in either transverse direction along the sides $c'$ and $d'$ of slot 19 over plate member 11 and plate member 11 will be slidable in either transverse direction along the sides $c$ and $d$ of slot 13 under plate member 10.

With the plate members 10 and 11 interlocked and laterally slidable along the sides of the respective open-ended slots, a compression spring 12 is inserted as a connection between the leg members 14 and 22. The compression spring 12 is received and supported on leg member 14 by the inward-facing projection 15 and on leg member 22 by the inward-facing projection 23.

When the device is thus completely assembled, the compression spring 12 exerts outward pressure against the leg members 14 and 22 which in turn force the plate members 10 and 11 in opposite-outward directions. The plate members 10 and 11 can be expanded in an opposite-outward lateral direction along the respective sides $c$ and $d$ and $c'$ and $d'$ to a point 25, 25' where the respective U-shaped tab members 16 and 20 and 17 and 21 adjacent the respective open ends $a$ and $a'$ meet and lock, thus effecting a positive stop. The plate members 10 and 11 can be compressed in an inward lateral direction to the point where the tabs 16 and 17 slidably moving along sides $c'$ and $d'$ of slot 19 engage and are blocked by leg member 22 extending upward from the closed end $b'$ of slot 19.

In actual operation, the device is compressed for insertion through the opening, the plate members 10 and 11 being compressed in a transverse inward direction. After the plate members have been inserted, release of the compression spring 12 will expand the plate members in an opposite outward lateral direction to the inner walls of the fowl. The inner walls of the fowl provide the support for the contours 26 and 27 of the plate members 10 and 11 and will exert pressure on the plate members thus giving added stability.

The plate members 10 and 11 carry respectively a prong 28 and 29 on the lower segment thereof for affixing to an inner wall for further stability. The plate members are preferably arcuate across the transverse axis and are preferably made of aluminum and the compression spring made of stainless steel, although it is recognized that other materials may be used.

After reading the foregoing detailed description of the illustrative and preferred embodiments of the instant invention, it should be apparent that the objects of this specification have been successfully achieved. Accordingly, what is claimed is:

1. A device for closing an opening in a fowl and adapted to be compressed and inserted therethrough and then expanded, comprising a pair of plate members, means cooperating with said plate members for coupling the same together for slidable movement relative to one another from a compressed position to an expanded position, and means for normally urging said members into said expanded position.

2. A device for closing an opening in a fowl and adapted to be compressed and inserted therethrough and then expanded, comprising two plate members, means carried on each of said plate members for slidably engaging and interlocking with the other of said plate members whereby one said plate member is relatively slidable over a portion of the other said plate member, spring means to normally maintain said plate members in expanded relation, and means carried on each of said plate members for engaging and supporting said spring means.

3. A device as defined in claim 2 wherein said plate members are at least arcuately convexly contoured at the opposite remote edges thereof to conform with the inner walls of a fowl, and be compressed thereby in a lateral inward direction.

4. A device as defined in claim 2, wherein said means for engaging and supporting said spring means are disposed in opposed relation with said spring means therebetween whereby when said plate members are inserted through an opening in a fowl, the said plate members flexibly expand in a lateral outward direction to engage the inner walls of the fowl.

5. A device as defined in claim 2 wherein said plate members have longitudinally aligned slots therein, at least one slot being in each plate member, a leg member extending upward from the one end of each said slot remote from the aligned slot in the other plate member, said leg members having inward-facing projections thereon for engaging and supporting the ends of said spring means, a pair of opposite-facing U-shaped tab members disposed on opposite sides of each slot and adjacent the end of each slot opposite said one end for engaging, receiving, guiding and interlocking the sides of the aligned slot in the other plate member.

6. A device as defined in claim 5 wherein each said plate member is an integral one-piece unit.

7. A device as defined in claim 5 wherein said opposite-facing U-shaped tab members of each said plate member are disposed to receive and engage the other plate member along the sides of the transverse slot of the said other plate member.

8. A device as defined in claim 2 wherein said plate members are arcuate across their length.

9. A device as defined in claim 2 wherein said plate members are made of aluminum, and wherein said spring means is a compression spring made of stainless steel.

10. A device as defined in claim 2 wherein each said plate member carries a prong member projecting outwardly from the base thereof for stabilizing engagement of said device within a fowl.

11. A device as defined in claim 2 wherein said means for slidably engaging and interlocking said plate members includes slot and cooperating guide means for maintaining said plate members slidably engaged and interlocked for reciprocal movement with respect to one another in opposite directions in all operations of said device.

No references cited.